United States Patent
Solans Artigas et al.

(10) Patent No.: US 12,369,578 B2
(45) Date of Patent: **\*Jul. 29, 2025**

(54) USE OF A NEMATICIDE COMPOSITION

(71) Applicant: DESARROLLO AGRICOLA Y MINERO, S.A., Saragossa (ES)

(72) Inventors: Carlos Solans Artigas, Saragossa (ES); Maria De Los Angeles Lario Carraminana, Saragossa (ES); Eitan Martin Oro, Saragossa (ES); David Bernad Viamonte, Saragossa (ES)

(73) Assignee: DESARROLLO AGRICOLA Y MINERO, S.A., Saragossa (ES)

( * ) Notice: Subject to any disclaimer, the term of this patent is extended or adjusted under 35 U.S.C. 154(b) by 995 days.

This patent is subject to a terminal disclaimer.

(21) Appl. No.: 17/437,364

(22) PCT Filed: Nov. 20, 2019

(86) PCT No.: PCT/ES2019/070792
§ 371 (c)(1),
(2) Date: Sep. 8, 2021

(87) PCT Pub. No.: WO2020/216969
PCT Pub. Date: Oct. 29, 2020

(65) Prior Publication Data
US 2022/0167612 A1 Jun. 2, 2022

(30) Foreign Application Priority Data
Apr. 24, 2019 (ES) ................ ES201930363

(51) Int. Cl.
*A01N 31/02* (2006.01)
*A01N 25/04* (2006.01)
*A01N 31/04* (2006.01)
*A01P 5/00* (2006.01)

(52) U.S. Cl.
CPC ............ *A01N 31/04* (2013.01); *A01N 25/04* (2013.01); *A01N 31/02* (2013.01); *A01P 5/00* (2021.08)

(58) Field of Classification Search
CPC ................. A01N 31/04; A01N 31/02
See application file for complete search history.

(56) References Cited

U.S. PATENT DOCUMENTS

| | | | |
|---|---|---|---|
| 4,978,686 A | 12/1990 | Sotome | |
| 6,291,401 B1 * | 9/2001 | Dufau | A01N 37/06 516/204 |
| 2013/0018107 A1 * | 1/2013 | Belkind | A01N 35/02 514/699 |
| 2014/0323583 A1 | 10/2014 | Belkind et al. | |

FOREIGN PATENT DOCUMENTS

| | | | |
|---|---|---|---|
| EP | 0889691 A2 | 1/1999 | |
| ES | 2012284 A6 | 3/1990 | |
| ES | 2033195 A1 | 3/1993 | |
| ES | 2163999 A1 | 2/2002 | |
| ES | 2328322 A1 | 11/2009 | |
| ES | 2559759 T3 | 2/2016 | |
| ES | 2682963 A1 | 9/2018 | |
| FR | 2529755 A1 * | 10/1988 | |
| KR | 100941915 B1 | 2/2010 | |
| WO | 2013040721 A1 | 3/2013 | |

OTHER PUBLICATIONS

Porter, Chapter 7: Non-ionics from Handbook of Surfactants, 1991, Springer Science & Business Media, p. 116-134 (Year: 119).*
Machine English translation of FR2529755A1, Crop protection method by means of cinnamaldehyde, 1988, p. 1-17. (Year: 1988).*
Oka, Yuji, Nematicidal activity of essential oil components against the root-knot nematode Meloidogyne javanica, Nematology 2001, Nov. 30, 2000, vol. 3, N° 2, pp. 159-164, ISSN 1388-5545, tables 1-4.
Li , Y C et al., Isolation of nematicidal constituents from essential oil of *Kaempferia galanga* L rhizome and their activity against Heterodera avenae Wollenweber, Tropical Journal of Pharmaceutical Research, Jan. 1, 2017, University of Benin nga, Jan. 1, 2017, vol. 16, N° 1, pp. 59-65, ISSN 1596-5996 (print) ISSN 1596-9827, (electronic), <DOI: doi:10.4314/tjpr.v16i1.8, table 2 and conclusion.
Calvet, Cint A et al., Evaluation of natural chemical compounds against root-lesion and root-knot nematodes and side-effects on the infectivity of arbuscular mycorrhizal fungi., European Journal of Plant Pathology, Jul. 2001. Jun. 30, 2001, vol. 107, N° 6, pp. 601-605, ISSN 0929-1873 figures 1 and 2, https://link.springer.com/article/10.1023%2FA%3A1017954315942, downloaded Sep. 8, 2021.
Marjanovic S Dorde et al., Antihelminic Activity of Cary Acrol, Thymol, Cinnamaldehyde and P-Cymen Against The Free-Living Nematode Caenorhabditis Elegans and Rat Pinworm *Syphacia muris*, Veterinary record (Belgrade) ,Dec. 2018. Nov. 30, 2018, vol. 68, N° 4, pp. 445-456, ISSN 0567-8315(print) ISSN 1820-7448(electronic), <DOI: doi:10.2478/acve-2018-0036> p. 446 and table 1.

(Continued)

*Primary Examiner* — Adam C Milligan
*Assistant Examiner* — Karen Cheng
(74) *Attorney, Agent, or Firm* — Notaro, Michalos & Zaccaria P.C.

(57) ABSTRACT

A method of phytosanitary treatment, which includes the step of administering a nematicidal composition, is disclosed. The nematicidal composition includes cinnamic aldehyde and terpene alcohol as active ingredients as a nematicide in a phytosanitary treatment, particularly in crops of banana, plantain, table and wine grapes, fruit trees, citrus plants, strawberries, and soy. Main advantages of the invention include high efficacy against nematodes, great stability over time, and the very low toxicity of the composition, both for plants and humans.

14 Claims, No Drawings

(56) References Cited

OTHER PUBLICATIONS

Hierro, I et al., In vivo larvicidal activity of monoterpenic derivatives from aromatic plants against L3 larvae of Anisakis simplex s.l. Phytomedicine, Jul. 10, 2006, Elsevier, Amsterdam, NL., Scheer Rainer; Alban Susanne; Becker Hans; Beer Andre-Michael; Blaschek Wolfgang; Kreis Wolfgang; Matthes Harald; Schilcher Heinz; Spahn Gunther; Stange Rainer, Oct. 7, 2006, vol. 13, N° 7, pp. 527-531, ISSN 0944-7113, <DOI: doi:10.1016/j.phymed.2005.05.001> tables 2 and 3.

Ntalli, Nikoletta G et al., Synergistic and antagonistic interactions of terpenes against Meloidogyne incognita and the nematicidal Activity of essential oils from seven plants indigenous to Greece, Pest Management Science Mar. 2011, Feb. 28, 2011, vol. 67, N° 3, pp. 341-351, ISSN 1526-498X(print) ISSN 1526-4998(electronic), <DOI: doi:10.1002/ps.2070> table 4.

Katiki, L M et al., Synergistic interaction of ten essential oils against Haemonchus contortus in vitro. \, Veterinary Parasitology, Jun. 7, 2017 Elsevier Science, Amsterdam, NL, Rosenthal Dr Benjamin; Zarlenga Dr Dante, Jul. 6, 2017, vol. 243, pp. 47-51, ISSN 0304-4017, <DOI: doi: 10.1016/j.vetpar.2017.06.008> tables 1-3.

Novato, T P L et al., Evaluation of the combined effect of thymol, carvacrol and (E)-cinnamaldehyde on Amblyomma sculptum (Acari: Ixodidae) and Dermacentor nitens (Acari: Ixodidae) larvae, Veterinary Parasitology, Sep. 15, 2015 Elsevier nld., Sep. 15, 2015, vol. 212, N° 3-4, pp. 331-335, ISSN 0304-4017 (print) ISSN 1873-2550 (electronic), <DOI: doi:10.1016/j.vetpar.2015.08.021> tables 3 and 4.

International Search Report for corresponding PCT application No. PCT/ES2019/070792, mailed Mar. 24, 2020.

* cited by examiner

USE OF A NEMATICIDE COMPOSITION

This description relates, as its title indicates, to a new use of a composition with phytosanitary activity, comprising two active ingredients: cinnamic aldehyde and terpene alcohol or alcohols for its use as a nematicide in the field of agriculture, particularly in crops of banana, plantain, table and wine grapes, fruit trees, citrus plants, strawberries, and soy.

FIELD OF THE INVENTION

The invention relates to the field of the use of phytosanitary products for treatment against nematodes in agricultural crops, particularly in crops of banana, plantain, table and wine grapes, fruit trees, citrus plants, strawberries, and soy.

CURRENT STATE OF THE ART

To gain a better understanding of this description we will establish a series of definitions in advance:

Nematodes: multicellular worms that belong to the group of helminths. They are found both in the water and the terrestrial environment. In reference to terrestrial environments, there are bacterivorous nematodes, fungivorous nematodes, nematodes that are predators of other nematodes, insect parasitic nematodes, animal parasitic nematodes and plant parasitic (phytoparasitic) nematodes. In the case of the present description, when we talk about nematodes, we refer to those that live in the terrestrial environmental, that have a plant parasitic activity and are known in the field of agriculture as "phytoparasitic nematodes".

Terpene alcohol: in this description the term terpene alcohol is understood to be the liquid product formed mostly (more than 70% weight/weight) by a single monoterpene alcohol such as, for example α-terpineol, or the multi-constituent mixture of terpene alcohols obtained essentially by monocyclic terpene alcohols (terpineols, 1-terpinen-4-ol, etc.) and, in a smaller proportion, by tri-cyclic terpene alcohols (fenchol, borneol, etc.).

Cinnamic aldehyde: organic compound whose IUPAC name is (2E)-3-phenylprop-2-enal and other names such as cinnamic aldehyde or cinnamaldehyde whose structural formula is $C_6H_5CHCHCOH$, and molecular formula is $C_9H_8O$. This compound can be obtained from natural sources or by chemical synthesis.

Ethoxylated castor oil: the castor oil obtained by reaction with ethylene oxide through an ethoxylation reaction. The various ethoxylated castor oils are classified according to the number of moles of ethylene or degree of ethoxylation.

Ethoxylated castor oil with a low degree of ethoxylation. Ethoxylated castor oil with an ethoxylation degree of between 5 and 20 moles.

Ethoxylated castor oil with a high degree of ethoxylation. Ethoxylated castor oil with an ethoxylation degree greater than 20 moles.

Calcium alkyl aryl sulfonate solution: a liquid product obtained by dissolving calcium alkyl aryl sulfonate at a final concentration of between 45% and 70% weight/weight in a solvent.

C11-C13 alcohols: a liquid product with a minimum content of 80% weight/weight of ethoxylated branched C11-C13 alcohols with >2.5 EO (EO=ethylene oxide) and characterised by CAS number: 68439-54-3.

Nematodes are one of the most serious problems facing modern agriculture given that their presence results in reduced crop yields. One of the most serious symptoms they can cause is stem necrosis in recently planted crops, although others, such as poor vigour, poor vegetative development, reduced production causing significant economic losses, abnormal leaf colour, general drying of crops and abnormal-looking root systems, can also be observed.

At present and as far as our knowledge goes, there exists a limited number of chemically synthesised, natural, or microbiological phytosanitary products for the control of this disease worldwide. Many of the existing products on the market have had to be banned and withdrawn from the market due to their high toxicity for humans or to the presence of toxic residues. This has caused great restrictions for farmers with regard to products that can be used, with the ensuing economic losses. For all of these reasons, there is a great demand in the industry for new nematicides that are highly effective and that also provide a substantial improvement in aspects such as toxicology, application safety and reduction or absence of residues, giving rise to very significant environmental and economic benefits for the agricultural industry.

BACKGROUND OF THE INVENTION

Some products and procedures for the treatment of nematodes are currently known, such as, for example, those described in patents ES2033195 "Improved pesticidal composition and method of preparation" and ES2012284 "Procedure for the preparation of new N-trichloromethylthio derivatives with biocidal activity" but they present the problem of using highly toxic organophosphates or chlorine derivatives, that are very much questioned at this moment due to their environmental impact and that are not considered advisable for food products for direct consumption Some products for agricultural uses that use aromatic aldehydes are also known, such as that described in patent EP0889691 "Use of aromatic aldehydes as pesticides" but employing a completely different composition, with low effectiveness, the use of which is not that described in this invention, but rather merely fungicidal. Likewise patent WO2013040721 "Method and system for producing ozonated natural oils and the application thereof in the treatment of humans, animals and vegetables, and in aquaculture" describes the use of a completely different product, with low effectiveness.

Patent US2014323583 "Cinnamaldehyde and diallyl disulfide formulations and methods of use" describes the use of cinnamic aldehyde as a nematicide, however it presents a complex synergy of the cinnamic aldehyde and diallyl disulfide in which the two substances are required for application. Moreover, cinnamic aldehyde is present in much higher concentrations than those described in this invention and it is used for tomato, cucurbitaceae and melon crops, while the present invention does not contain diallyl disulfide nor are the target crops the same, and with different problems regarding the type of nematodes.

Likewise, patent KR100941915 "Anti-pinewood nematode compound containing cinnamaldehyde extracted from *cinnamomum cassia* and its structurally-similar compounds", describes a nematicidal composition for use in pine conifers, with a very different form of usage and different crops to those described in this invention. Patent U.S. Pat. No. 4,978,686 "Method of protecting crops by a non-toxic composition" describes the combined and necessary use of cinnamic aldehyde mandatorily with an antioxidant.

Finally, patents ES2163999 "Composition of natural origin to control postharvest fruit and vegetable pathology and method of application", ES2328322 "Compositions of natural origin to treat physiopathies and diseases caused by postharvest fruit and vegetable pathogens and a method of application" and ES2682963 "Fungicidal composition for the treatment of banana and/or plantain plants" describe the use of cinnamic aldehyde and terpene alcohol for use merely as a fungicide, which is far from the use advocated in this invention.

DESCRIPTION OF THE INVENTION

To resolve the problems that currently exist with protection against nematodes in the field of agriculture, particularly in crops of banana, plantain, table and wine grapes, fruit trees, citrus plants, strawberries, and soy, improving the current state of the art, the new use of a composition as a nematicide, until now not used in this field of application, has been envisaged. This composition comprises two substances as active ingredients, cinnamic aldehyde and terpene alcohols combined with ethoxylated castor oil, C11-13 alcohols, and calcium alkyl aryl sulfonate solution.

Cinnamic aldehyde is one of the two active ingredients with nematicidal activity, which is combined with the terpene alcohol as a compound with a dual function: to act as a nematicidal active ingredient and to improve the application of the product, acting as a soil adjuvant, improving the penetration and dispersion of the product in the soil and allowing it to reach the nematodes distributed at root level.

The composition is formulated as an emulsifiable concentrate for the preparation of liquid phytosanitary formulations to treat the problem of nematodes in different agricultural crops. This composition, used until now as a fungicide, has been found to be surprisingly effective for the treatment of nematodes in crops of banana, plantain, table and wine grapes, fruit trees, citrus plants, strawberries, and soy, according to the experimental trials carried out.

Its use is mainly by means of fertigation or drench application. A product application dose of between 1.5 l/ha and 10.0 l/ha, preferably between 2.5 l/ha and 7.5 l/ha, is used.

ADVANTAGES OF THE INVENTION

This novel use of the phytosanitary composition for treating problems of nematodes in banana and plantain, table and wine grapes and fruit trees, citrus plants, strawberries, and soy, that is presented, affords numerous advantages over the products currently available, the most important being that it offers a high degree of efficacy against nematodes in the aforementioned crops compared to the chemically synthesised or natural products currently known for use in these horticultural crops. It is important to highlight the advantage that the use of this composition presents a very positive toxicological profile by international standards, compared to other chemically synthesised products, thanks to the use of the active ingredients cinnamic aldehyde and terpene alcohols. This can lead to this composition being declared free of phytosanitary residues, with the clear agricultural, sanitary, economic, and environmental benefits this represents over synthetic products.

Furthermore, it is important to highlight the benefit arising from the use of this nematicidal composition, since it does not include antioxidants, as is usually the case in other compositions with similar substances. This is because the composition used is able to maintain the structure and prevent the active product, cinnamic aldehyde, from degrading due to oxidation, resulting in a stable product, according to international standards for this type of product. As a result, the incorporation of antioxidant substances, which can act as contaminants is avoided, this way minimising the toxicity of the composition for humans or its phytotoxicity for plants.

Another important advantage of this use is that it also includes another substance with nematicidal activity, terpene alcohols, that have a dual function; on the one hand increasing the nematicidal efficacy per se, and on the other, increasing the effectiveness of the application of the product, as they contribute by acting as a soil adjuvant, improving the penetration and dispersion of the product in the soil and allowing the nematodes distributed at root level to be reached.

Another advantage of this new use of the nematicidal composition is that it is more economical compared to traditional chemical phytosanitary products.

PREFERRED EMBODIMENT OF THE INVENTION

The use of the composition presented consists of carrying out phytosanitary treatment against nematodes in the field of agriculture, particularly in crops of banana, plantain, table and wine grapes, fruit trees, citrus plants, strawberries, and soy.

The composition used basically comprises:
Cinnamic aldehyde (active ingredient)
Terpene alcohols (active ingredient),
A mixture of ethoxylated castor oils with a high degree of ethoxylation,
Ethoxylated castor oil with a low degree of ethoxylation,
C11-13 alcohols,
Calcium alkyl aryl sulfonate in solution.

The cinnamic aldehyde is present in a proportion of between 20% and 45% by weight, preferably 25-35% by weight, with respect to the total weight of the composition.

The terpene alcohols, for example α-terpineol, are present in a proportion of between 5% and 10% by weight, preferably between 6% and 8% by weight, with respect to the total weight of the composition.

The mixture of ethoxylated castor oils comprises at least two ethoxylated castor oils with a high degree of ethoxylation. The degree of ethoxylation of these oils is between 20 and 40 moles, preferably between 30 and 40 moles, and more preferably chosen from the group formed by 35, 36 and 40 moles. This mixture of ethoxylated castor oils with a high degree of ethoxylation is present in a proportion of between 20% and 40% by weight, preferably between 25% and 35% by weight, with respect to the total weight of the composition.

Furthermore, at least an ethoxylated castor oil with a low degree of ethoxylation is also used. The degree of ethoxylation of this oil is between 5 and 20 moles, preferably between 8 and 15 moles, and more preferably between 9 and 10 moles. This ethoxylated castor oil with a low degree of ethoxylation is present in a proportion of between 0.4% and 2% by weight, preferably between 0.5% and 1% by weight, with respect to the total weight of the composition.

The C11-13 alcohols are present in a proportion of between 25% and 40% by weight, preferably between 30% and 35% by weight, with respect to the total weight of the composition.

The calcium alkyl aryl sulfonate solution is present in a proportion of between 1% and 5% by weight, preferably between 1.5% and 2% by weight, with respect to the total weight of the composition.

Use of this composition as a nematicide is carried out by fertigation, by drench application or in a band at the furrow base during planting. A product application dose of between 1.5 l/ha and 10.0 l/ha, preferably between 2.5 l/ha and 7.5 l/ha, is used.

Experimental trials carried out using this phytosanitary composition with nematicidal action in diverse crops, particularly in crops of banana, plantain, table and wine grapes, fruit trees, citrus plants, strawberries, and soy, have shown its notable effectiveness against nematodes.

Application Conditions and Results Obtained Experimentally in the Field

To reflect the efficacy of the invention presented in this description, comparative studies were performed in laboratory and commercial conditions.

In the experimental studies carried out, surprisingly it has been found that the substance added as a soil adjuvant, the terpene alcohols, have shown nematicidal efficacy. Thus, the combined use of cinnamic aldehyde and terpene alcohol give rise to a formulation with a notable improvement in its efficacy and/or the agronomic results obtained.

Example 1

Study of the Nematicidal Efficacy of the Formulation and of the Raw Materials Cinnamic Aldehyde and Terpene Alcohol The aim of the protocol was to evaluate the nematicidal efficacy of the formulation and of the active ingredients, cinnamic aldehyde and terpene alcohol, separately. For this trial *M. incognita* and *M. javanica* nematodes were used.

Treatments:
1. Untreated control specimen: Eggs or juvenile nematodes in sterile water.
2. Eggs or juveniles with 0.025% of the formulation in sterile water.
3. Eggs or juveniles with 0.05% of the formulation in sterile water.
4. Eggs or juveniles with 0.1% of the formulation in sterile water.
5. Eggs or juveniles with 0.025% of terpene alcohol in sterile water plus innocuous solvent.
6. Eggs or juveniles with 0.05% of terpene alcohol in sterile water plus innocuous solvent.
7. Eggs or juveniles with 0.1% of terpene alcohol in sterile water plus innocuous solvent.
8. Eggs or juveniles with 0.025% of cinnamic aldehyde in sterile water plus innocuous solvent.
9. Eggs or juveniles with 0.05% of cinnamic aldehyde in sterile water plus innocuous solvent.
10. Eggs or juveniles with 0.1% of cinnamic aldehyde in sterile water plus innocuous solvent.

Results:

The treatments with juveniles hatched at 0 h, 24 h, 48 h and 72 h. The number of hatched eggs was determined approximately every 72 h for 3-4 weeks. At the end of the counts of juveniles, the solutions were eliminated from each of the wells, they were washed several times in sterile water to eliminate the tested compounds and the mobility of juveniles after 24 h in sterile water was estimated. This allowed to determine if the compounds tested have any nematostatic or hatching inhibition effect. All of the counts were carried out using a stereoscopic microscope.

Juvenile Mortalities

For the formulation of this invention: the mortality of J2 in both species was similar and reached 100% in all of the treatments in less than 24 h. After removal of the product and 24 h observation, no mobility was found in immobile juveniles and hence they were considered to be dead and there was no nematostatic activity (induction of inactivity in juveniles). Breaks and disaggregation were also observed in the membranes of juveniles, in some cases with nematode internal matter emerging from the dead juveniles.

For the cinnamic aldehyde and terpene alcohol: 100% mortality of *M. incognita* J2 was achieved with all of the cinnamic aldehyde concentrations in less than 24 h, while with terpene alcohol 50% was achieved at 24 h.

Egg Hatching

For the formulation of the present invention: an important reduction in hatching is observed in both species with the formulation tested. Microscopic observations reveal the great variability in the morphology of the eggs tested after treatment. Significant disorganisation was observed only in some of the eggs, and some were observed to be alive.

For cinnamic aldehyde and terpene alcohol: the results for the hatching of *M. incognita* eggs were similar to those obtained with juveniles. Cinnamic aldehyde inhibited the hatching of juveniles in all of the concentrations tested. However, terpene alcohol had an effectiveness of around 25%.

The conclusions of the example indicate that the composition shows very good results in the laboratory experiments conducted. These results show that both active ingredients have nematicidal efficacy.

Example 2

Study of the Nematicidal Efficacy of the Formulation and of the Raw Materials Cinnamic Aldehyde and Terpene Alcohol The aim of the protocol was to evaluate the effect of the agricultural composition of the present invention applied as a nematicide to combat *Rotylenchulus* sp, and *Helicotylenchus* sp nematodes in table grapes. Location: Peru. Variety: Crimson.

Treatments:
T0: Control specimen
T1: Formulation of the present invention Dose 5 l/ha.
T2: Microbiological commercial product Dose 20 l/ha.
Number of applications: 3
Application method: Fertigation.

The efficacy outcomes are shown in the following table:

| Treatment | Efficacy (%) *Rotylenchulus* sp | Efficacy (%) *Helicotylenchus* sp |
| --- | --- | --- |
| T0: Control specimen | 0.0 | 0.0 |
| T1: Formulation of the present invention | 79.5 | 85.0 |
| T2: Microbiological commercial product | 33.6 | 42.0 |

The conclusions of the example indicate that the composition presented affords very good results in terms of efficacy. Results above 45% are considered effective in treatments against nematodes.

In these conditions and doses, the composition presented shows agronomic results against nematodes of the same order or greater than many chemical or natural products registered and used for this same purpose.

A person skilled in the art will easily comprehend that the characteristics of different embodiments can be combined with the characteristics of other possible embodiments, provided that the combination is technically possible.

All of the information referring to examples or embodiments form part of the description of the invention.

The invention claimed is:

1. A method of phytosanitary treatment, comprising the step of administering a nematicidal composition to crops, wherein the nematicidal composition comprises:
    as the first active ingredient, cinnamic aldehyde in a proportion of between 20% and 40% by weight with respect to the total weight,
    as the second active ingredient, terpene alcohol in a proportion of between 5% and 10% by weight with respect to the total weight,
    a mixture of at least two ethoxylated castor oils with a high degree of ethoxylation in a proportion of between 20% and 40% by weight with respect to the total weight, with a degree of ethoxylation of between 20 and 40 moles,
    C11-13 alcohols in a proportion of between 25% and 40% by weight with respect to the total weight,
    calcium alkyl aryl sulfonate in solution, in a proportion of between 1% and 5% by weight with respect to the total weight, and
    ethoxylated castor oil with a low degree of ethoxylation in a proportion of between 0.4% and 2% by weight with respect to the total weight, with a degree of ethoxylation of between 5 and 20 moles.

2. The method of phytosanitary treatment according to claim 1, wherein the first active ingredient, cinnamic aldehyde, is present in a proportion of between 25% and 35% with respect to the total weight.

3. The method of phytosanitary treatment according to claim 1, wherein the second active ingredient, terpene alcohol, is present in a proportion of between 6% and 8% with respect to the total weight.

4. The method of phytosanitary treatment according to claim 1, wherein the mixture of at least two ethoxylated castor oils with a high degree of ethoxylation has a degree of ethoxylation of between 30 and 40 moles.

5. The method of phytosanitary treatment according to claim 1, wherein the mixture of at least two ethoxylated castor oils with a high degree of ethoxylation has a degree of ethoxylation selected from the group consisting of 35, 36, and 40 moles.

6. The method of phytosanitary treatment according to claim 1, wherein the C11-13 alcohols are present in a proportion of between 30% and 35% with respect to the total weight.

7. The method of phytosanitary treatment according to claim 1, wherein the mixture of at least two ethoxylated castor oils with a high degree of ethoxylation is present in a proportion of between 25% and 35% with respect to the total weight.

8. The method of phytosanitary treatment according to claim 1, wherein the calcium alkyl aryl sulfonate in solution is present in a proportion of between 1.5% and 2% with respect to the total weight.

9. The method of phytosanitary treatment according to claim 1, wherein the ethoxylated castor oil with a low degree of ethoxylation has a degree of ethoxylation of between 5 and 20 moles.

10. The method of phytosanitary treatment according to claim 1, wherein the ethoxylated castor oil with a low degree of ethoxylation has a degree of ethoxylation of between 9 and 10 moles.

11. The method of phytosanitary treatment according to claim 1, wherein the crops are selected from the group consisting of banana, plantain, table grapes, wine grapes, fruit trees, citrus plants, strawberries, and soy.

12. The method of phytosanitary treatment according to claim 1, wherein the application of the nematicidal composition is by a procedure selected from the group consisting of fertigation, drench application, and in a band at the furrow base during planting.

13. The method of phytosanitary treatment according to claim 1, wherein a dose application of the nematicidal composition of between 1.5 l/ha and 10 l/ha is used.

14. The method of phytosanitary treatment according to claim 1, wherein a dose application of the nematicidal composition of between 2.5 l/ha and 7.5 l/ha is used.

* * * * *